(12) United States Patent
Polzer

(10) Patent No.: US 12,546,910 B2
(45) Date of Patent: Feb. 10, 2026

(54) NON-CONTACTING ANGULAR ENCODER FOR DETERMINATION OF RELATIVE ORIENTATION OF TWO REFERENCE FRAMES ATTACHED COMPLIANTLY

(71) Applicant: 1789658 Ontario Ltd O/A Nova Mining Exploration Solutions, Sudbury (CA)

(72) Inventor: Benjamin David Polzer, Sudbury (CA)

(73) Assignee: 1789658 Ontario Ltd O/A Nova Mining Exploration Solutions, Sudbury (CA)

( * ) Notice: Subject to any disclaimer, the term of this patent is extended or adjusted under 35 U.S.C. 154(b) by 155 days.

(21) Appl. No.: 18/613,755

(22) Filed: Mar. 22, 2024

(65) Prior Publication Data

US 2024/0329274 A1 Oct. 3, 2024

Related U.S. Application Data

(60) Provisional application No. 63/455,145, filed on Mar. 28, 2023.

(51) Int. Cl.
*G01V 3/10* (2006.01)
*G01R 35/00* (2006.01)
*G01V 3/165* (2006.01)

(52) U.S. Cl.
CPC ........... *G01V 3/104* (2013.01); *G01R 35/005* (2013.01); *G01V 3/165* (2013.01)

(58) Field of Classification Search
CPC ....... G01V 3/104; G01V 3/165; G01R 35/005
See application file for complete search history.

(56) References Cited

U.S. PATENT DOCUMENTS

| 5,307,072 A | 4/1994 | Jones, Jr. |
| 6,073,043 A | 6/2000 | Schneider |

(Continued)

FOREIGN PATENT DOCUMENTS

| CA | 2665179 A1 | 4/2008 |
| CA | 3021964 A1 | 11/2017 |
| CA | 2741011 C | 4/2020 |

OTHER PUBLICATIONS

James C. Macnae, Y.Lamontagne and G.F.West, "Noise Processing Technique for Time Domain EM Systems"; Geophysics, vol. 49, No. 7, Jul. 1984 p. 934-948.

*Primary Examiner* — Eman A Alkafawi
*Assistant Examiner* — Suresh K Rajaputra
(74) *Attorney, Agent, or Firm* — Moffat & Co

(57) ABSTRACT

A method within an electromagnetic sensing system including transmitting first, second and third reference signals from first, second and third transmitter coils, the coils having different dipole moment directions and forming a first transmitter coil set; reading the reference signals at each of a plurality of spaced sensors within a sensor chassis, where the sensor chassis moves independently from the first transmitter coil set, the reference signals having sinusoidal time variation and being harmonics of a base frequency with a period being an epoch, an origin of which is a time at which the reference signals are all at zero phase; synchronously stacking signals read by each sensor, creating a stacked signal for each of the sensors; processing the stacked signal for each sensor to create a matrix of complex coupling coefficients; and using the matrix to determine a relative orientation of the sensor chassis to the transmitter coil set.

20 Claims, 8 Drawing Sheets

(56) References Cited

U.S. PATENT DOCUMENTS

| | | |
|---|---|---|
| 7,970,477 B2 | 6/2011 | Loeb et al. |
| 8,188,728 B2 | 5/2012 | Pullini |
| 8,278,929 B2 | 10/2012 | Summerfield et al. |
| 8,456,159 B2 | 6/2013 | Polzer et al. |
| 11,635,476 B2* | 4/2023 | Kleiner .................... G01S 1/00 |
| | | 324/202 |
| 2009/0015262 A1* | 1/2009 | Strack ..................... G01V 3/12 |
| | | 340/852 |
| 2013/0238270 A1* | 9/2013 | Khalfin ................. G01D 18/00 |
| | | 702/94 |
| 2016/0356601 A1* | 12/2016 | Lescourret ......... G01C 21/1654 |

* cited by examiner

NON-CONTACTING ANGULAR ENCODER FOR DETERMINATION OF RELATIVE ORIENTATION OF TWO REFERENCE FRAMES ATTACHED COMPLIANTLY

FIELD OF THE DISCLOSURE

The present disclosure relates to surveying systems, and in particular relates to electromagnetically sensitive surveying systems.

BACKGROUND

Electromagnetic surveying is one technique used in mineral exploration. The technique comprises detecting the response of the ground to the propagation of electromagnetic fields.

In many cases, an extremely sensitive electromagnetic sensor is carried on or towed behind a vehicle such as an airplane, drone or helicopter for air-based surveys, a boat, car, or truck for land and water-based surveys, or the sensor may be stationary, among other options. Such sensor must be capable of detecting very weak magnetic fields, and interference from other electronics near such sensor is a problem.

SUMMARY

The present disclosure provides for systems and methods within an electromagnetic sensing system for determining the orientation of a sensor chassis. Specifically, as the sensors may be sensitive to interference from other electronics, such as Inertial Measurement Units. Because of this it is often not possible to position a second sensor nearby for the purposes of determining the orientation of the electromagnetic sensor and methods are required to determine this important information. Thus, in the present disclosure, methods and systems are provided for measuring the orientation of the sensor chassis relative to the vehicle.

In one aspect, a method within an electromagnetic sensing system may be provided. The method may comprise transmitting a first reference signal from a first transmitter coil, a second reference signal from a second transmitter coil, and a third reference signal from a third transmitter coil, the first transmitter coil, second transmitter coil and third transmitter coil having different dipole moment directions forming a first transmitter coil set. The method may further comprise reading the first reference signal, second reference signal and third reference signal at each of a plurality of spaced sensors within a sensor chassis, where the sensor chassis is configured to move independently from the first transmitter coil set and the first reference signal, second reference signal and third reference signal all having purely sinusoidal time variation and all being harmonics of a base frequency with a period being an epoch, an origin of which is a time at which the first reference signal, second reference signal and third reference signal are all at zero phase. The method may further comprise synchronously stacking signals read by each of the spaced sensors, the synchronous stacking starting at the origin of the epoch, thereby creating a stacked signal for each of the spaced sensors and processing the stacked signal for each of the spaced sensors to create a matrix of complex coupling coefficients. The method may further comprise determining a relative orientation of the sensor chassis to the transmitter coil set based on the matrix of complex coupling coefficients.

In some embodiments, the origin of the epoch may be determined by finding a reversed time delay that results in coefficients in the matrix of complex coupling coefficients to become real.

In some embodiments, the finding may minimize an objective function Ø.

In some embodiments, the method may further comprise scaling and calibrating the first, second and third reference signals.

In some embodiments the first transmitter coil set is a set distance from the sensor unit.

In some embodiments, the method may further comprise transmitting the first reference signal from a fourth transmitter coil, the second reference signal from a fifth transmitter coil, and the third reference signal from a sixth transmitter coil, the fourth transmitter coil, fifth transmitter coil and sixth transmitter coil forming a second transmitter coil set.

In some embodiments, the second transmitter coil set may be offset from the first transmitter coil set at a determined distance.

In some embodiments, the use of the first transmitter coil set and the second transmitter coil set removes effects from changes in a location of the plurality of spaced sensors.

In some embodiments, the method may further comprise transmitting the first reference signal, the second reference signal and the third reference signal from a third transmitter coil set.

In some embodiments, the method may use an Inertial Measurement Unit electromagnetically isolated from the sensor unit (either by virtue of being shielded or by virtue of separation) to find an absolute orientation of the first transmitter coil set.

In a further aspect, an electromagnetic sensing system may be provided. The electromagnetic sensing system may comprise a first transmitter coil set comprising a first transmitter coil, a second transmitter coil and a third transmitter coil, each having a different dipole moment direction; a sensor chassis containing a plurality of spaced sensors, where the sensor chassis is configured to move independently from the first transmitter coil set; and a processor. The electromagnetic sensing system may be configured to transmit a first reference signal from the first transmitter coil, a second reference signal from the second transmitter coil, and a third reference signal from the third transmitter coil, and read the first reference signal, second reference signal and third reference signal at each of a plurality of spaced sensors within a sensor chassis, where the sensor chassis is configured to move independently from the first transmitter coil set and the first reference signal, second reference signal and third reference signal all having purely sinusoidal time variation and all being harmonics of a base frequency with a period being an epoch, an origin of which is a time at which the first reference signal, second reference signal and third reference signal are all at zero phase. The electromagnetic sensing system may further be configured to synchronously stack signals read by each of the spaced sensors, the synchronous stacking starting at the origin of the epoch, thereby creating a stacked signal for each of the spaced sensors, process the stacked signal for each of the spaced sensors to create a matrix of complex coupling coefficients, and determine a relative orientation of the sensor chassis to the transmitter coil set based on the matrix of complex coupling coefficients.

In some embodiments, the electromagnetic sensing system may further be configured to determine the origin of the epoch by finding a reversed time delay that results in coefficients in the matrix of complex coupling coefficients to become real.

In some embodiments, the electromagnetic sensing system may be configured to find the reversed time delay by minimizing an objective function Ø.

In some embodiments, the electromagnetic sensing system may further be configured to scale and calibrate the first, second and third reference signals.

In some embodiments, the first transmitter coil set may be a set distance from the sensor unit.

In some embodiments, the electromagnetic sensing system may further comprise a second transmitter coil set comprising a fourth transmitter coil, a fifth transmitter coil and a sixth transmitter coil, each having different dipole moment directions, wherein the electromagnetic sensing system is further configured to: transmit the first reference signal from the fourth transmitter coil, the second reference signal from the fifth transmitter coil, and the third reference signal from the sixth transmitter coil.

In some embodiments, the second transmitter coil set is offset from the first transmitter coil set by a determined distance.

In some embodiments, the use of the first transmitter coil set and the second transmitter coil set may remove effects from changes in a location of the plurality of spaced sensors.

In some embodiments, the electromagnetic sensing system may further comprise a third transmitter coil set, wherein the electromagnetic sensing system may further be configured to transmit the first reference signal, the second reference signal and the third reference signal into the respective coils of the third transmitter coil set.

In some embodiments, the electromagnetic sensing system may further comprise using an Inertial Measurement Unit electromagnetically isolated from the sensor unit (either by virtue of being shielded or by virtue of separation) to find an absolute orientation of the first transmitter coil set.

BRIEF DESCRIPTION OF THE DRAWINGS

The present disclosure will be better understood with reference to the drawings, in which.

DETAILED DESCRIPTION

Figure 1:
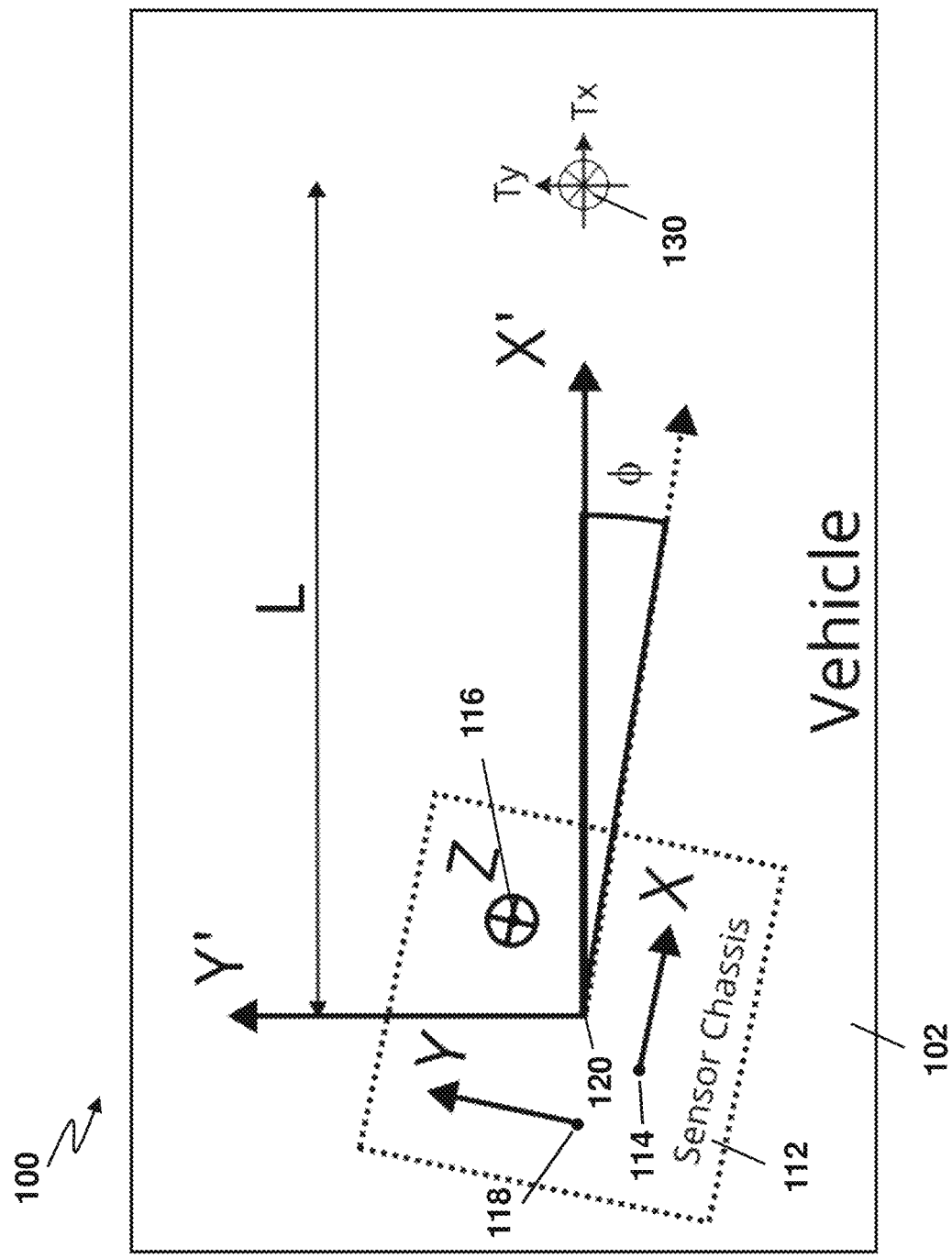
FIG. 1 is a block diagram showing a plan view of a sensor system on a vehicle having reference signal transmitter coil sets displaced from a sensor unit.

While the present disclosure is described below with regard to electromagnetic surveying, this is merely provided for illustration purposes. The techniques used for determining relative orientation of two reference frames could equally be used in other situations, and thus the description is not limited to electromagnetic surveying sensors.

In one embodiment, the present disclosure relates to a 3-axis sensor set rigidly mounted to a sensor chassis which is itself mounted to a vehicle. The sensor chassis is supported by a vibration and rotation isolation system so that the sensors may rotate and translate to a degree relative to the vehicle through a center of rotation, thereby allowing the sensor chassis to be decoupled from linear vibration and rotational jitter of the vehicle.

In some cases, it is important that the absolute orientation of the sensor chassis be recorded. For example, in electromagnetic surveying with vector-component sensors, sensors that detect an aspect of the electromagnetic field in a particular direction, it may be important to know the orientation of the sensor to ensure that data recorded by the sensor can be correlated to other sensor and location data. Specifically, often the sensor chassis has independent vector-component electromagnetic sensors which are slightly spaced apart and oriented in different planes. For example, in some cases three independent vector-component electromagnetic sensors oriented orthogonally to each other may be provided.

However, while the present disclosure describes the sensors being in different planes, those in the art with will realize that such sensors may be actually constructed in a way that they do not occupy a precisely defined plane. Rather, the orientation of such sensors may be defined with regard to the direction in which they are sensitive to aspects of the magnetic field. Each sensor in this case may establish a sensitivity direction such that the sensitivity directions of the three coils are substantially independent and ideally mutually orthogonal.

The orientation of such sensor chassis having the independent electromagnetic sensors may vary. For example, if the sensor chassis is towed behind an aircraft, wind and air currents may cause the orientation of the sensor chassis to change. Further, vibrational damping elements, such as those described in U.S. Pat. No. 8,456,159 to Polzer et al., the contents of which are incorporated herein by reference, may allow the sensor chassis to rotate about a central axis, and further to sway on said axis, causing orientation changes.

However, it is not possible to mount an Inertial Measurement Unit (IMU) directly to the sensor chassis because of the electromagnetic interference that it causes. The orientation of the vehicle can be determined by an IMU located on the vehicle far enough from the sensor set and suitably shielded so that the operation of the IMU and transmission of its digital data do not create electromagnetic interference (EMI) that can be sensed by the sensor set.

Accordingly, the present disclosure provides methods and systems for measuring the orientation of the sensor chassis relative to the vehicle.

Reference is now made to FIG. 1, which provides a block diagram of a plan view of a system 100 having a vehicle 102. In the example of FIG. 1, a sensor chassis 112 is mounted to a vehicle 102 through a compliant mount (not shown). Three sensors 114, 116 and 118 are mounted in independent directions on the sensor chassis 112 and may not necessarily be orthogonal.

For practical reasons the sensors 114, 116 and 118 are may not be co-located and are generally displaced from the center of rotation 120. Specifically, the sensors 114, 116 and 118 may be separated due to their size, which may not allow physical co-location. Further, in some cases sensors 114, 116 and 118 may have to be spaced apart to reduce sensor to sensor interference.

The sensor chassis 112 may be mounted to the vehicle 102 via an isolation system (not shown) which provides compliance to isolate the sensors from linear and rotational accelerations.

The vehicle 102 may, for example, be an aircraft, a boat, ship, space-craft, land-based vehicle with tires or tracks or may be a platform placed on the ground designed to make "stationary" measurements but where the measurement system is required to reduce the effects of ground motion, among other options.

The sensor chassis 112 may be described by a Cartesian coordinate system (X,Y,Z) and the vehicle 102 may be described by a Cartesian system (X',Y',Z'). In general, the axes of the two systems are not parallel due to the compliance of the translational and rotational isolation systems.

In the example of FIG. 1, in order to simplify the drawings, there is an angle $\phi$ between X and X' and between Y and Y' due to a rotation about the z axis. However, in general the systems will be related by rotations about all three axes and can be described by Eulerian angles or by a rotation matrix.

Embodiments of the present disclosure provide for three sets of small transmitter coils, each set comprising three coils (Tx, Ty, and Tz) having different dipole moment directions, and in some embodiments with dipole moments ideally orthogonal. The first coils set 130 is shown mounted to the vehicle 102, with coil within the set carrying current in the form of a sin wave at a distinct precise frequency, and each coil within the set thus providing a time varying reference field. The transmitter coil set 130 is arranged on the vehicle so that the three reference fields are orthogonal at a location on the sensor chassis 112. In the example of FIG. 1 each coil creates a magnetic dipole with its axis perpendicular to each respective coil.

However, in other embodiments the fields may not be orthogonal. For example, in some embodiments it is possible that the transmitter coils in the first coil set 130 are not orthogonal as long as they are in substantially independent directions. In these cases, an additional step may exist where the complex matrix extracted from the reference signals may be multiplied by a real-valued correction matrix to transform the coefficients for the non-orthogonal sensor case compared with those for the orthogonal case.

The signals from the three transmitter coils of the first coil set 130 (the reference fields) are sensed along with the rest of the ambient signal. With knowledge of the precise frequencies of each transmitter in the transmitter coil set 130, the intensity of the signal of each reference field in each of the three sensors 114, 116 and 118 can be determined, providing in a 3×3 matrix of relative coupling coefficients. To be able to determine the rotation between the coordinate systems the signals transmitted into the three transmitter coils of set 130 (the reference signals), must have their frequencies and phases chosen in a particular manner.

Thus, from FIG. 1, a sensor chassis 112 with coordinate system (X,Y,Z) is mounted to a vehicle 102 through a compliant mount that allows it to become misaligned with the coordinate system of the vehicle 102 (X',Y',Z'). Three sensors 114, 116 and 118 are mounted in independent directions on the sensor chassis 112, which may not necessarily be orthogonal. For practical reasons the sensors 114, 116 and 118 are not co-located. Three transmitter coil sets 130 Tx, Ty and Tz are mounted to the Vehicle in this case along the X' axis. The origin is the nominal center 120 of the sensor chassis 112.

Choosing the Coil Signal Relationship

The three coils of set 130 are driven by signals at three distinct frequencies f1, f2 and f3 respectively. To enable extraction of the coupling coefficient matrix, these signals are generally harmonics of a common base frequency Bf.

The signals are typically also phase-coherent so that at the start of each "epoch", the signals are in phase with each other. The time interval of an epoch is the inverse of the base frequency, as shown with regard to FIG. 2. Thus, the frequencies are related as $f1=Bf*P$; $f2=Bf*Q$; $f3=Bf*R$ where P, Q and R are integers.

Figure 2:
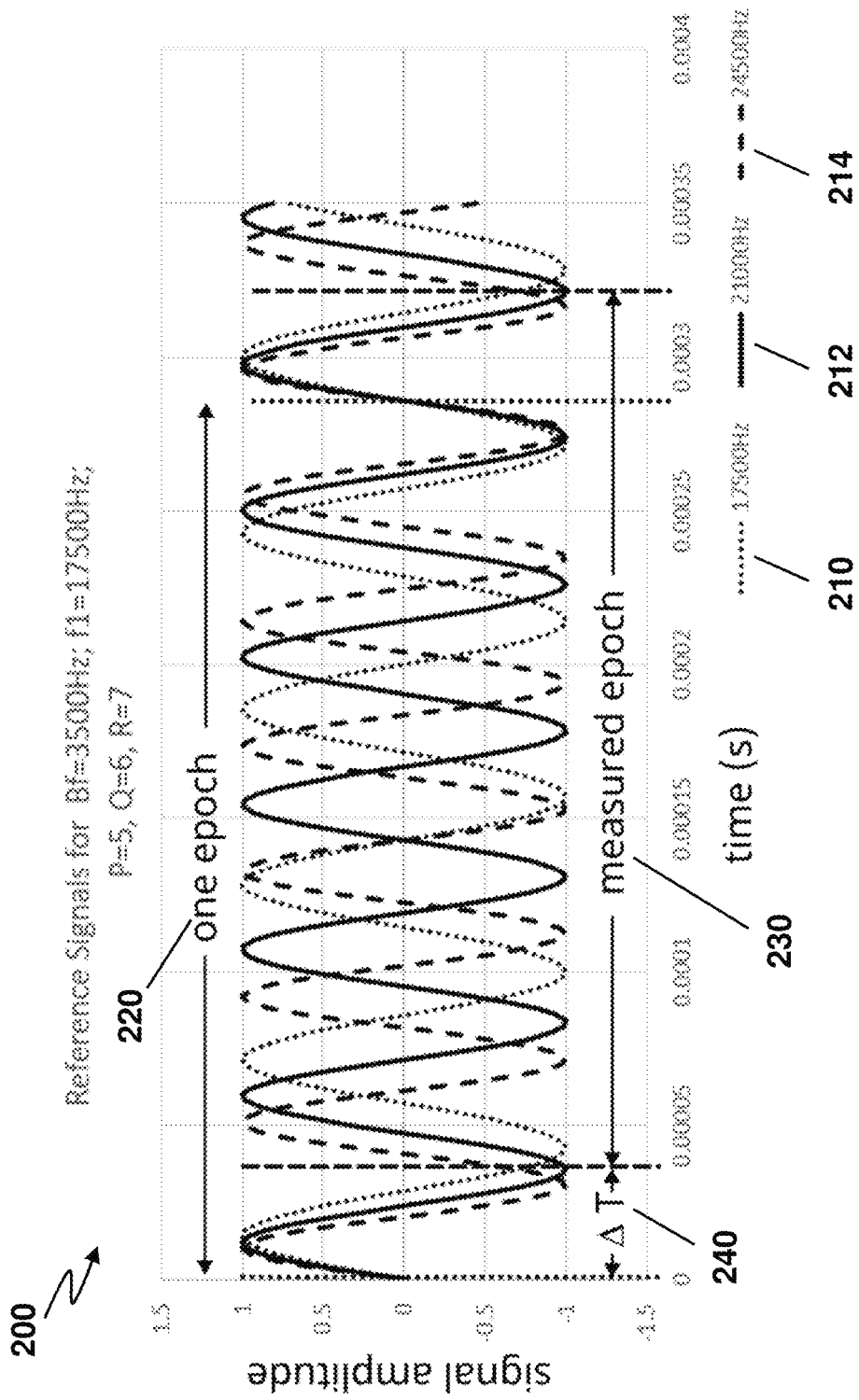
FIG. 2 is a plot of three reference signals during a time epoch and having a measured epoch displaced by an interval.

FIG. 2 shows a plot 200 of the reference signals 210, 212 and 214. In particular, FIG. 2 shows how the three reference signals are related to the epoch 220 being all in phase with a phase angle of zero at the start of each epoch. In general, it may not be known when the start of an epoch occurs so data processing may be required for any measured epoch interval 230 as shown, and the time delay $\Delta t$ 240 between the start of the epoch and the start of the epoch intervals used for processing may then be discovered and corrected for.

The example of FIG. 2 shows a relationship of three reference signals based on indices P=5, Q=6, R=7 for a base frequency of 3500 Hz. The reference signals 210, 212 and 214 are at zero phase every period of the base frequency Bf=3500 Hz. In general, the start of each epoch 220 is not known and a starting point is assumed for the sake of processing. The delay time $\Delta t$ 240 can be estimated and corrected for in a secondary processing step.

Algorithm for Extraction of Coupling Matrix

In general, each sensor 114, 116 and 118 in the sensor set is recording its signal of interest in addition to the signals of each of the three reference fields from transmitter coil sets 130, as well as noise. A rate (samples per second) may be pre-determined for the evaluation of the orientation. For example, in one case such rate may be 30 Hz. However, other rates are possible, and the present disclosure is not limited to 30 Hz.

The number of epochs that can be fit within one evaluation is determined. In the example shown in FIG. 2, the epoch 220 is about 0.35 ms long so that there are about 116 epochs available for each determination of the rotation matrix.

In accordance with embodiments of the present disclosure, a span of the time series may be selected centered on the desired evaluation time for the rotation matrix and the data may be synchronously stacked, for example using 116 epochs. It is easiest if the synchronous stacking is phase coherent, with the start of an epoch aligning with the start of the stacking. However, the more general case also explored herein requires no independent knowledge of the location of the epoch boundaries. For example, synchronous stacking is described in James C. Macnae, Y. Lamontagne and G. F. West, "*Noise Processing Technique for Time Domain EM Systems*"; Geophysics, volume 49, no 7, July 1984 P 934-948, the contents of which are incorporated herein by reference.

For the synchronous stacking, the number of samples may be pre-determined to represent one epoch so that this sample rate is the same or higher than the intrinsic sampling rate to avoid aliasing. In some embodiments, this number should in general be even and should be representable as $2^N$ for an integer N if "Fast Fourier Transforms" are to be used to extract the three harmonic components.

Interpolation of some kind (e.g. linear) may be used to evaluate the data at the points required for the synchronous stacking.

Figure 3:
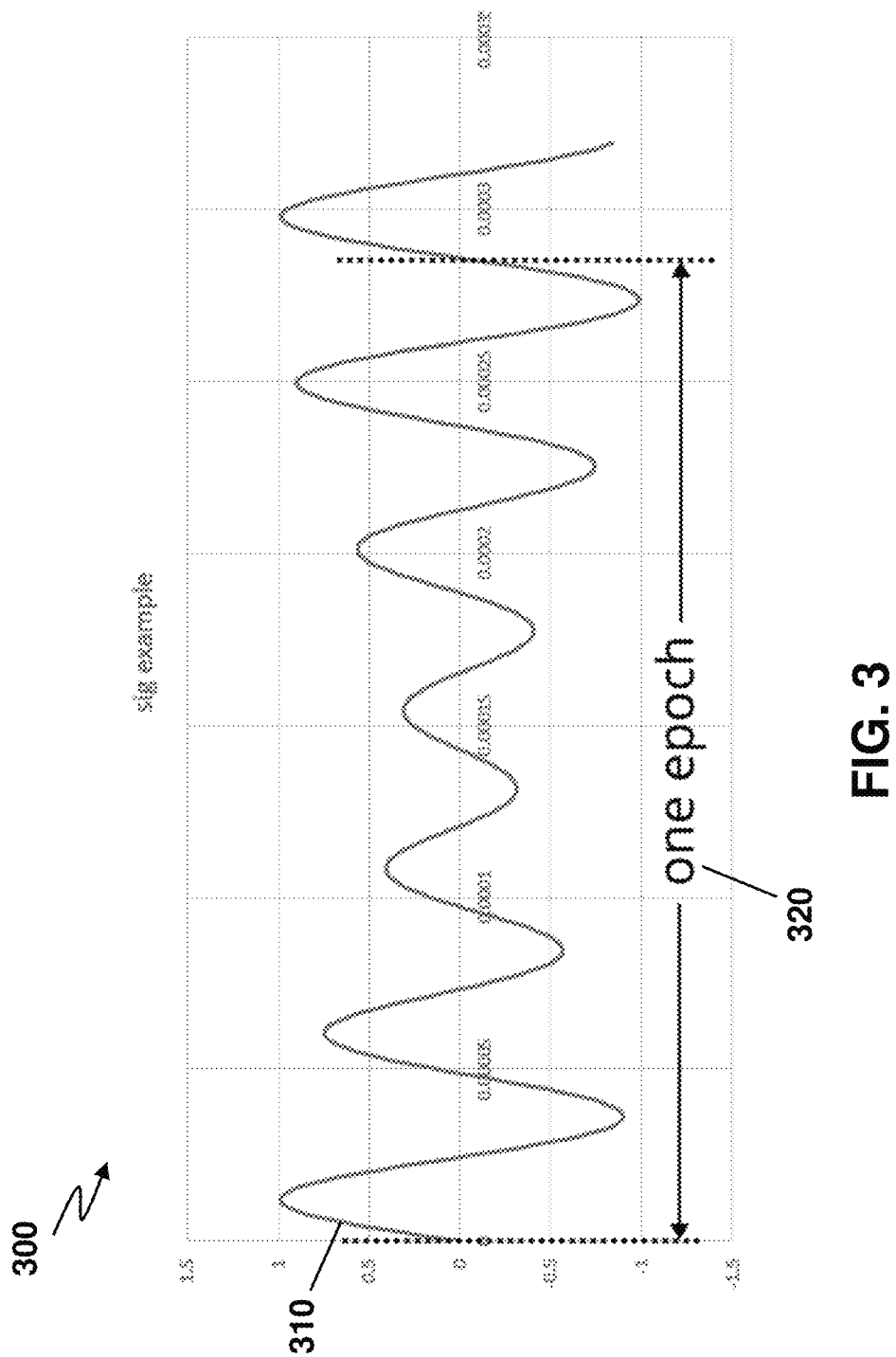
FIG. 3 is a plot showing a combined signal at a sensor receiving three reference signals.

The result of the synchronous stacking is a time series of reduced noise representing one epoch. Reference is now made to FIG. 3, which shows a plot 300 of a signal 310, and shows what this might look like for a single sensor as it is composed of the three different reference signals. In general, the stack will not be starting at the start of the epoch 320 as shown, but at a random location which depends on the start time of the time series used for the synchronous stacking.

However, the three sensors 114, 116 and 118 are co-sampled. As the time series of each sensor is processed in lockstep, the relative phases of the three harmonics corresponding to the reference signals from the transmitter coil sets 130 are derivable from the common time delay, $\Delta t$.

Figure 4:
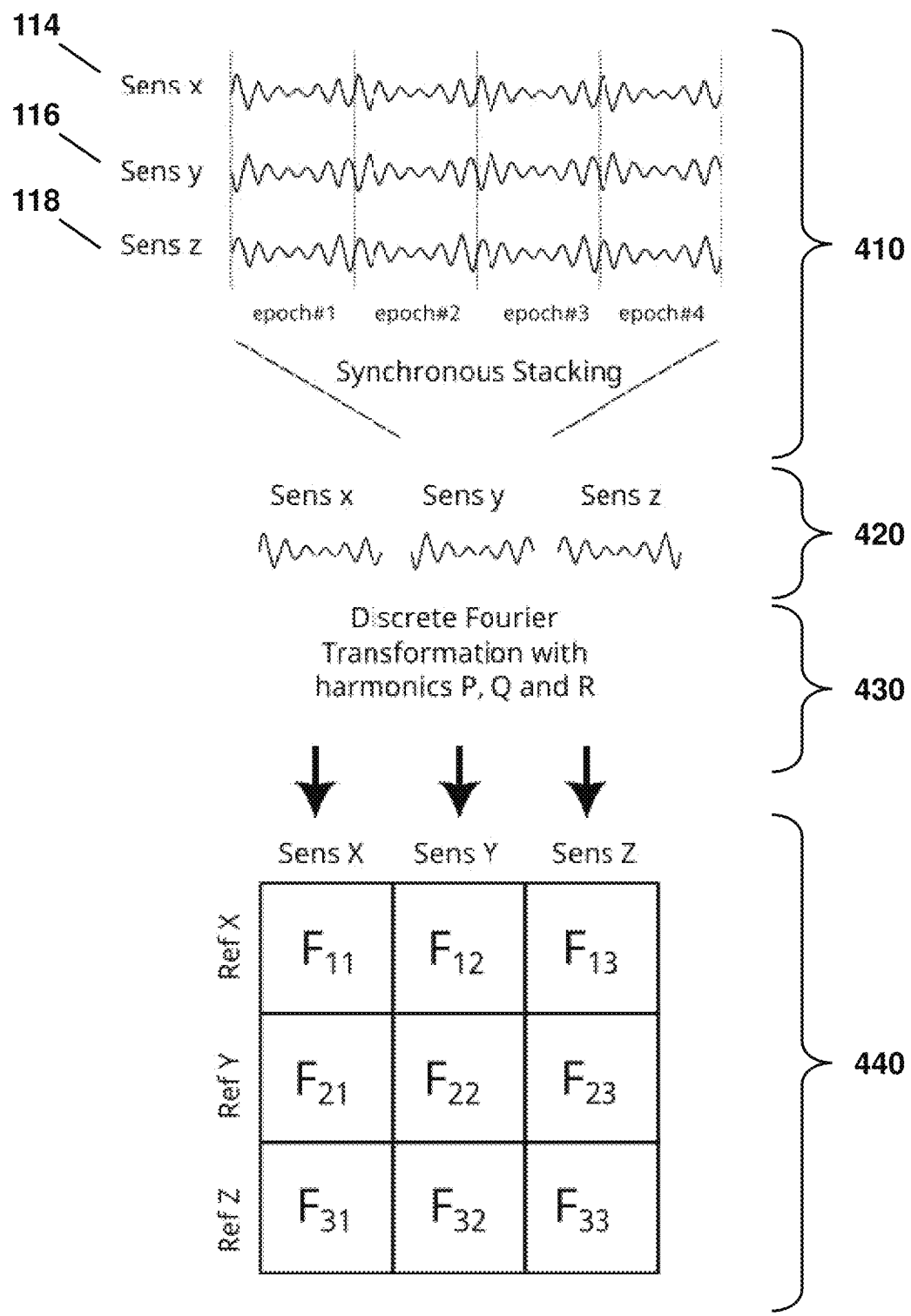
FIG. 4 is block diagram showing a processing algorithm to derive 3×3 "F" matrix of complex coupling coefficients.

An example of the processing workflow is shown in FIG. 4, which provides a processing algorithm to derive 3×3 "F" matrix of complex coupling coefficients. Specifically, a complex-valued 3×3 matrix is generated from the P, Q and R harmonics of the discrete Fourier Transform of the synchronously stacked data of each of the three sensors.

In particular, each of sensors 114, 116 and 118 reads the reference signals from the transmission coil set 130 at block 410 over a plurality of epochs. The signals may then be synchronously stacked for each sensor, shown at block 420.

The stacked signals may then be processed, for example using a discrete Fourier Transform with harmonics P, Q and R, as shown at block 430.

This then creates a 3×3 matrix 440 of complex coupling coefficients.

Correcting the F Matrix for Errors in Phase caused by $\Delta t$

If the synchronous stacking is aligned with the start of the epoch, then the reference signals will all be in phase and if no other signals or noise existed, the complex F matrix elements will all be real numbers. Conversely, if the synchronous stacking is not aligned with the start of the epoch, then the matrix elements will have imaginary parts reflecting the time delay between the start of the epoch and the start of the synchronous stacking $\Delta t$. The effect of this delay on the Fourier Transforms (FT) is to multiply the FT for the synchronized case by a phase rotation, as shown with equations 1A and 1B below.

$$f(t) \leftrightarrow F(\omega) \quad (1A)$$

$$f(t + \Delta t) \leftrightarrow F(\omega)e^{i\omega \Delta t} \quad (1B)$$

Based on the above, it is known that each row of the F matrix is comprised of the coefficient for the reference signal stacked in sync with the epoch, multiplied by its corresponding phase rotation. The coefficients for the synchronized case can be estimated from the measured coefficients by finding the (reversed) time delay that will make the F matrix coefficients become all real numbers, or at least minimize the sum squares (or other misfit measure) of the imaginary components of the matrix coefficients, among other options.

Explicitly, given the definitions for gamma in equations 2A, 2B and 2C:

$$\gamma_1 = 2\pi P f_b \quad (2A)$$

$$\gamma_2 = 2\pi Q f_b \quad (2B)$$

$$\gamma_3 = 2\pi R f_b \quad (2C)$$

the corrected F matrix elements can be derived by minimizing an objective function $\emptyset$ defined by equation 3:

$$\emptyset = [F_{11}e^{i\gamma_1 \Delta t}]_{im}^2 + [F_{12}e^{i\gamma_1 \Delta t}]_{im}^2 + [F_{13}e^{i\gamma_1 \Delta t}]_{im}^2 + \\ [F_{21}e^{i\gamma_2 \Delta t}]_{im}^2 + [F_{22}e^{i\gamma_2 \Delta t}]_{im}^2 + [F_{23}e^{i\gamma_2 \Delta t}]_{im}^2 + [F_{31}e^{i\gamma_3 \Delta t}]_{im}^2 + \\ [F_{32}e^{i\gamma_3 \Delta t}]_{im}^2 + [F_{33}e^{i\gamma_3 \Delta t}]_{im}^2 \quad (3)$$

with respect to the unknown $\Delta t$ to find the optimal delay $\Delta t_{opt}$. The optimization is nonlinear so any number of standard techniques can be used. Most robustly, a sequence of trial values for $\Delta t$ can be plugged into the expression for phi, the optimal value being the value of $\Delta t$ that yields to smallest $\emptyset$. However, other options are possible.

Scaling and Calibration of the Reference Signals

Each of the three transmitter coil sets 130 produces a mutually orthogonal vector field at the location of the sensor chassis. A step is required to divide each of the observed reference fields by the expected field strength so as to equalize the reference signal strengths. This can be done at any number of places in the processing workflow, including but not limited to: on the raw time series; after synchronous stacking and Fourier transformation; or on the final F matrix coefficients, among other options.

Transmitter Coil Configurations

The simplest transmitter coil set is comprised of three collocated coils producing magnetic fields in the form of dipoles oriented in the X', Y' or Z' directions. Consider the case of the X' axis and Y'-axis of the vehicle horizontal with the first transmitter coil set located on the X'-axis a distance L from the sensor chassis 112, as shown in FIG. 1. If the transmitter dipoles are all located on the X' axis, an arrangement with each transmitter dipole oriented in the cardinal directions of the chassis coordinate system will provide the required mutually-orthogonal reference fields at the location of the sensor chassis, although the field strengths will not be the same; a fact that may be corrected for when determining the relative orientation.

In general, the three individual coils of this simplest set of three coils do not have to be arranged on the X' axis, but can be so arranged so their fields are mutually orthogonal at the sensor chassis and of known relative amplitude. While this arrangement of transmitter dipoles works well for a punctual sensor set, in practice the sensors may not be all centered exactly on the same point and the sensors themselves have a finite size. Thus their signal is a weighted average of the magnetic field over the volume of the sensor. Moreover, the sensors 114, 116 and/or 118 may be moving laterally to a small degree in relation to the vehicle as lateral accelerations cause mechanical accommodation in the components that provide vibration isolation. Because of these facts, it may be desirable to provide a reference field with as small a spatial gradient as possible.

Consider the reference field at the sensor set for the first transmitter coil set on the X' axis at X'=L. The gradients of the field of each of the transmitter dipoles (the reference signals) can be computed at the origin. Since the fields at the origin for the three transmitter dipoles can be represented by a 3×3 tensor, the gradient in each direction is itself a tensor which can be computed as equations 4A, 4B and 4C:

$$GradX = \frac{1}{L^4}\begin{bmatrix} 6 & 0 & 0 \\ 0 & -3 & 0 \\ 0 & 0 & -3 \end{bmatrix} \quad (4A)$$

$$GradY = \frac{1}{L^4}\begin{bmatrix} 0 & -3 & 0 \\ -3 & 0 & 0 \\ 0 & 0 & 0 \end{bmatrix} \quad (4B)$$

$$GradZ = \frac{1}{L^4}\begin{bmatrix} 0 & 0 & -3 \\ 0 & 0 & 0 \\ -3 & 0 & 0 \end{bmatrix} \quad (4C)$$

Note that the gradient components in all three directions from all three transmitters have an inverse fourth power of the distance behavior. This strong gradient may be a problem since it means that small changes in the location of the sensors, either in a static sensor because they are displaced from the origin of the sensor chassis, or in a dynamic sense due to accommodation of the isolation system, can cause changes in the sensed field that can be misconstrued as rotations of the sensor chassis relative to the vehicle.

This problem can be alleviated by combining the fields of two transmitter coils of the same orientations at different distances from the sensor chassis, thereby creating a field of zero gradient at the sensor chassis. If the distance to the proximal transmitter is L with a strength of M then the second transmitter is located at (L+Δ) with a strength of −N. We can find the location as the dimensionless ratio Δ/L which results in a stationary point at the origin as the solution to the equation 5:

$$\frac{M}{L^4} = \frac{N}{(L+\Delta)^4} \quad (5)$$

Which has the solution:

$$\frac{\Delta}{L} = \sqrt[4]{\frac{N}{M}} - 1 \quad (6)$$

If the transmitter strengths N and M are equated with the integer number of windings of a continuous signal feed from the control board, then different solutions are obtained for different winding ratios. The simplest, and the solution that results in the lowest inductance for the circuit is M=1, N=2 which gives a value of Δ/L of 0.1892.

Figure 5:
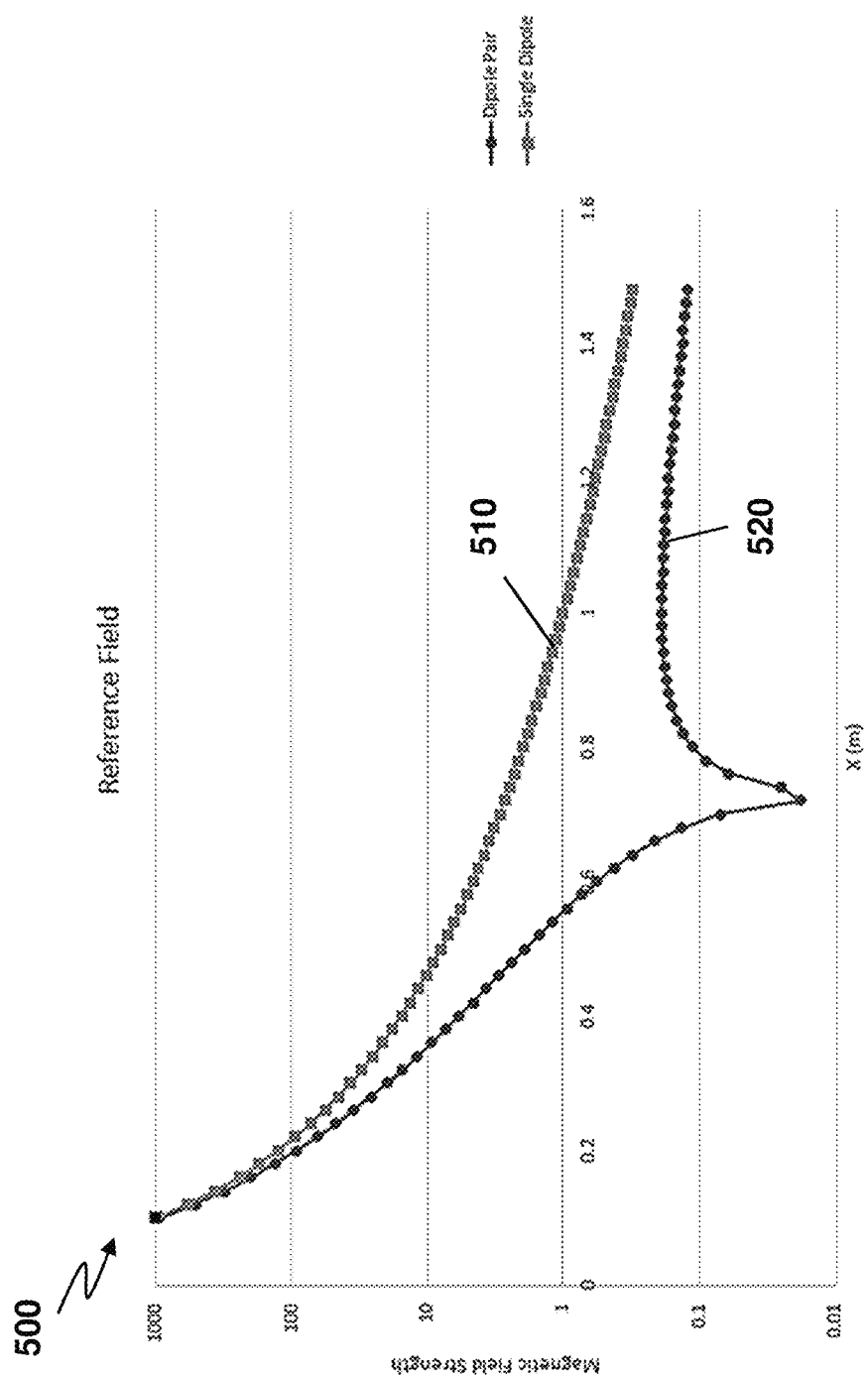
FIG. 5 is a plot of a comparison of reference field strength of a single dipole transmitter with a pair of dipole transmitters of strength 1.0 and −2.0 separated by 0.1892 m.
Figure 6:
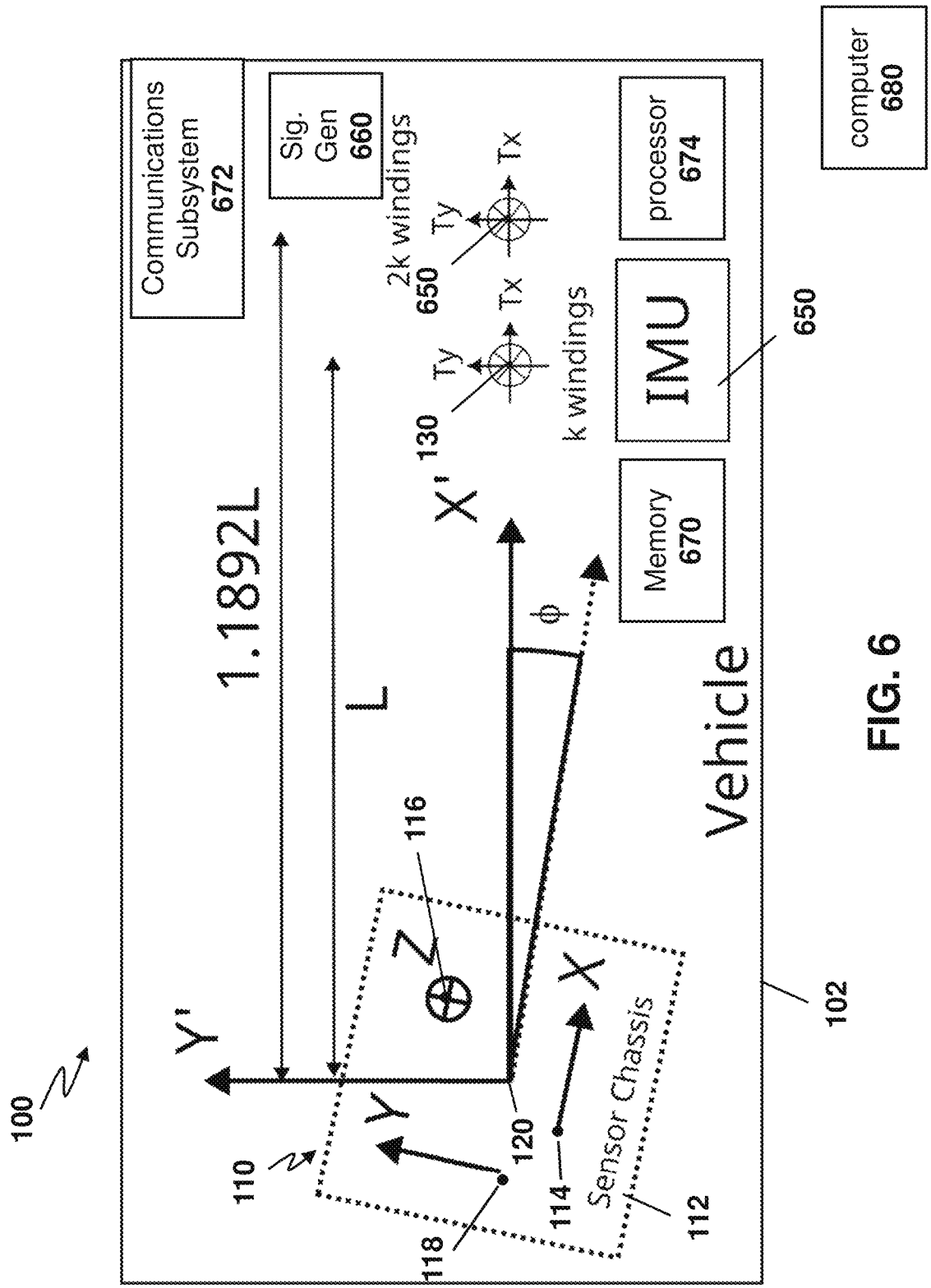
FIG. 6 is a block diagram showing a plan view of a sensor system on a vehicle having two reference signal transmitter coil sets displaced from a sensor unit

FIG. 5 illustrates this effect in plot 500 for the case of M=1 and N=−2. In particular, FIG. 5 provides a comparison of reference field strength of a single dipole transmitter 510 with a pair of dipole transmitters 520 of strength 1.0 and −2 separate by 0.1892 m. Note the substantial area of low gradient created centered on x=1 m due to the opposing influences of the two dipoles Thus, reference is made to FIG. 6, which shows an embodiment in this modified form, incorporating a second set of transmitter coils 650 at a set distance from the sensor chassis 112. In the example of FIG. 6, this set distance is 1.1892 L. However, other distances are possible. Like numerals are used as in FIG. 1 for the remaining components.

The coils of this transmitter coil set 650 set have twice the number of windings as the first transmitter coil set 130 and are wound in the reverse sense in the example of FIG. 6. However, again other windings are possible either with two transmitter sets or more.

The present disclosure is therefore not limited to one or two transmitter coil sets, and could, in some cases, have three or more transmitter coil sets. Therefore, FIG. 6 could be expanded and transmitter coil sets 650 could represent two or more transmitter coil sets. In this case, the spacing between the transmitter coil sets could be determined based on the number of windings in the various transmitter coil sets.

Specifically, with more transmitter coil sets, it is possible to find combinations of winding ratios and offset distances that will not only null the first derivative of the field with distance, but will minimize higher order derivatives so as to provide an even wider range of low gradient to accommodate displacements. For instance, for a set of three dipole transmitter coil sets, two governing equations may exist. A first equation, shown with equation 7 below, may be used to minimize the first derivative.

$$\frac{M}{L^4} + \frac{N}{(L+\Delta_1)^4} + \frac{P}{(L+\Delta_2)^4} \quad (7)$$

The second equation, shown with equation 8, may be used to minimize the second derivative.

$$\frac{M}{L^5} + \frac{N}{(L+\Delta_1)^5} + \frac{P}{(L+\Delta_2)^5} \quad (8)$$

In equations 7 and 8, M, N and P are the dipole magnitudes usually chosen to be an integer corresponding to the respective number of windings. Solutions to this and higher order equation sets (e.g. 3 or more transmitter coil sets) may not be possible in closed form, and they will have a greater variety of solutions for the offset distances depending on the choice of winding ratios, but such equation sets can be solved numerically.

Figure 7:
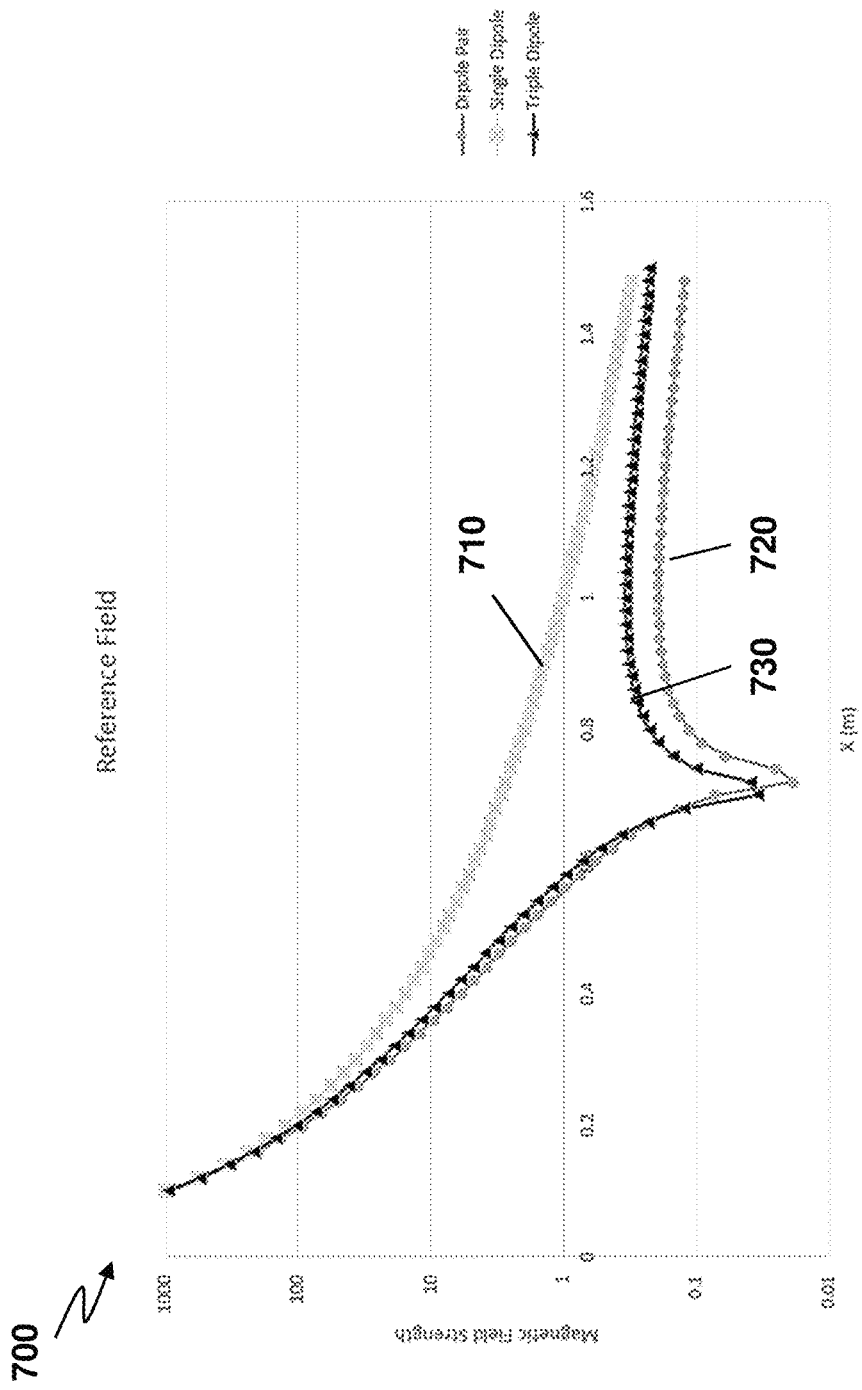
FIG. 7 is plot showing a comparison of reference field strength of a single dipole transmitter with a pair of dipole transmitters of strength (1.0, −2.0) separated by 0.1892 m and a triplet of dipole transmitters of strengths (2.0, −5.0, −2.0) separated by (0.289 m, 0.8 m).

FIG. 7 provides a plot 700 which illustrates the case for three transmitter dipole sets. In particular, FIG. 7 provides a comparison of reference field strength of a single dipole transmitter 710, with a pair of dipole transmitters 720, and a triple dipole 730 with M=2.0, N=−5.0 and P=−2.0 separated by (0.289 m, 0.8 m). The triplet arrangement provides zero gradient at x=1, a zero derivative at x=0 and widens the zone of low gradient as compared to the dipole pair.

Therefore, using the embodiments above, the orientation of the sensor chassis as it is taking sensor measurements can therefore be accurately determined, allowing for better quality survey results in some embodiments.

Referring again to FIG. 6, as will be appreciated by those in the art, the transmitter coil sets may simply be windings and be served by one or more signal generators 660. Similar signal generators could exist in the embodiment of FIG. 1.

Further, data from sensors could be stored in a memory 670 in some cases. In some cases, such data may be transmitted using a communications subsystem 672.

In some cases, the data may be processed using a processor 674 at vehicle 102. However, in other cases, processing could occur on a computing device or network element 680 located outside of vehicle 102. For example such data may be transmitted over the air, downloaded once sensing has completed, among other options, for processing.

Similar elements could exist with the embodiment of FIG. 1.

The processing of the signals as described above can occur on any computing device. One simplified diagram of a computing device is shown with regard to FIG. 8. The computing device of FIG. 8 could be any fixed or mobile computing device.

Figure 8:
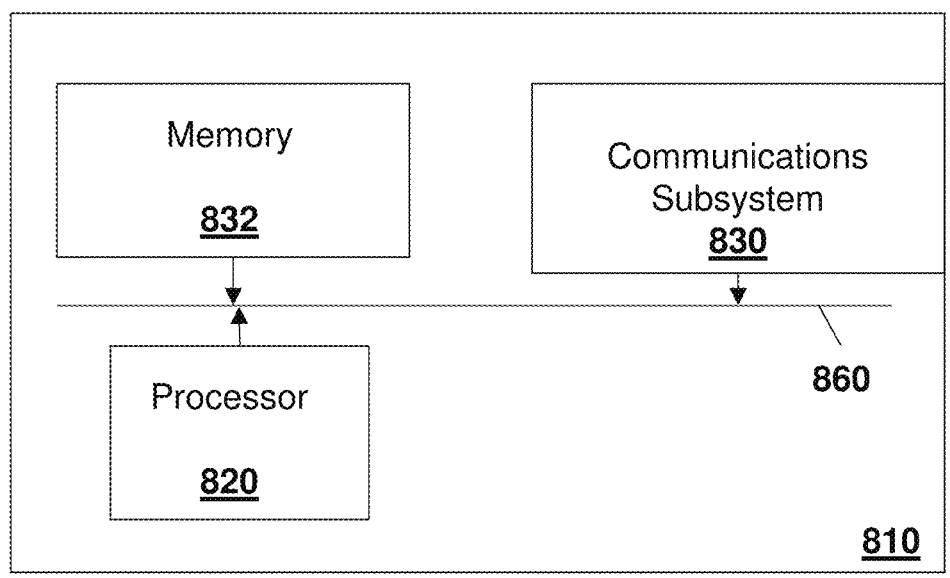
FIG. 8 is a block diagram of a simplified computing device capable of performing the embodiments described herein.

In FIG. 8, device 810 includes a processor 820 and a communications subsystem 830, where the processor 820 and communications subsystem 830 cooperate to perform the methods of the embodiments described above. Communications subsystem 830 allows device 810 to communicate with other devices or network elements and may vary based on the type of communication being performed. Further, communications subsystem 830 may comprise a plurality of communications technologies, including any wired or wireless communications technology.

Processor 820 is configured to execute programmable logic, which may be stored, along with data, on device 810, and shown in the example of FIG. 8 as memory 832. Memory 832 can be any tangible, non-transitory computer readable storage medium which stores instruction code that, when executed by processor 820 cause device 810 to perform the methods of the present disclosure. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 832, device 810 may access data or programmable logic from an external storage medium, for example through communications subsystem 830.

Communications between the various elements of device 810 may be through an internal bus 860 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems, or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

The invention claimed is:

1. A method within an electromagnetic sensing system, the method comprising:
   transmitting a first reference signal from a first transmitter coil, a second reference signal from a second transmitter coil, and a third reference signal from a third transmitter coil, the first transmitter coil, second transmitter coil and third transmitter coil having different dipole moment directions and forming a first transmitter coil set;
   reading the first reference signal, second reference signal and third reference signal at each of a plurality of spaced sensors within a sensor chassis, where the sensor chassis is configured to move independently from the first transmitter coil set and the first reference signal, second reference signal and third reference signal all having purely sinusoidal time variation and all being harmonics of a base frequency with a period being an epoch, an origin of which is a time at which the first reference signal, second reference signal and third reference signal are all at zero phase;
   synchronously stacking signals read by each of the spaced sensors, the synchronous stacking starting at the origin of the epoch, thereby creating a stacked signal for each of the spaced sensors;
   processing the stacked signal for each of the spaced sensors to create a matrix of complex coupling coefficients; and
   determining a relative orientation of the sensor chassis to the transmitter coil set based on the matrix of complex coupling coefficients.

2. The method of claim 1, further comprising determining the origin of the epoch by finding a reversed time delay that results in coefficients in the matrix of complex coupling coefficients to become real.

3. The method of claim 2, wherein the reversed time delay is found by minimizing an objective function Ø, such that:

$$\emptyset = [F_{11}e^{i\gamma_1\Delta t}]_{im}^2 + [F_{12}e^{i\gamma_1\Delta t}]_{im}^2 + [F_{13}e^{i\gamma_1\Delta t}]_{im}^2 + [F_{21}e^{i\gamma_2\Delta t}]_{im}^2 +$$
$$[F_{22}e^{i\gamma_2\Delta t}]_{im}^2 + [F_{23}e^{i\gamma_2\Delta t}]_{im}^2 + [F_{31}e^{i\gamma_3\Delta t}]_{im}^2 + [F_{32}e^{i\gamma_3\Delta t}]_{im}^2 + [F_{33}e^{i\gamma_3\Delta t}]_{im}^2$$

where $F_{AB}$ is a value in the matrix of complex coupling coefficients and A and B are values from 1 to 3, and $\Delta t$ is a time shift between a measured start of epoch and the epoch origin where the first, second and third reference signals are at zero phase, where $\gamma_1=2\pi P f_b$; $\gamma_2=2\pi Q f_b$; $\gamma_3=2\pi R f_b$; where $f_b$ is a base frequency; and where P, Q and R are integer multiples of the base frequency.

4. The method of claim 1, further comprising scaling and calibrating the first, second and third reference signals.

5. The method of claim 1, wherein the first transmitter coil set is a set distance from the sensor chassis.

6. The method of claim 5, further comprising:
   transmitting the first reference signal from a fourth transmitter coil, the second reference signal from a fifth transmitter coil, and the third reference signal from a sixth transmitter coil, the fourth transmitter coil, fifth transmitter coil and sixth transmitter coil forming a second transmitter coil set.

7. The method of claim 6, wherein the second transmitter coil set is offset from the first transmitter coil set according to:

$$\frac{\Delta}{L} = \sqrt[4]{\frac{N}{M}} - 1$$

where L is the distance between a center of the sensor chassis and the first transmitter coil set, M is the signal strength of reference signals from the first transmitter coil set; N is the signal strength of reference signals from the second transmitter coil set; and Δ is the distance between the first transmitter coil set and the second transmitter coil set.

8. The method of claim 7, wherein the use of the first transmitter coil set and the second transmitter coil set removes effects from changes in a location of the plurality of spaced sensors.

9. The method of claim 6, further comprising:
transmitting the first reference signal, the second reference signal and the third reference signal from a third transmitter coil set.

10. The method of claim 1, further comprising using an Inertial Measurement Unit electromagnetically isolated from the sensor chassis to find an absolute orientation of the first transmitter coil set.

11. An electromagnetic sensing system comprising:
a first transmitter coil set comprising a first transmitter coil, a second transmitter coil and a third transmitter coil, each having a different dipole moment directions;
a sensor chassis containing a plurality of spaced sensors, where the sensor chassis is configured to move independently from the first transmitter coil set; and
a processor,
wherein the electromagnetic sensing system is configured to:
transmit a first reference signal from the first transmitter coil, a second reference signal from the second transmitter coil, and a third reference signal from the third transmitter coil;
read the first reference signal, second reference signal and third reference signal at each of a plurality of spaced sensors within a sensor chassis, where the sensor chassis is configured to move independently from the first transmitter coil set and the first reference signal, second reference signal and third reference signal all having purely sinusoidal time variation and all being harmonics of a base frequency with a period being an epoch, an origin of which is a time at which the first reference signal, second reference signal and third reference signal are all at zero phase;
synchronously stack signals read by each of the spaced sensors, the synchronous stacking starting at the origin of the epoch, thereby creating a stacked signal for each of the spaced sensors;
process the stacked signal for each of the spaced sensors to create a matrix of complex coupling coefficients; and
determine a relative orientation of the sensor chassis to the transmitter coil set based on the matrix of complex coupling coefficients.

12. The electromagnetic sensing system of claim 11, wherein the electromagnetic sensing system is further configured to determine the origin of the epoch by finding a reversed time delay that results in coefficients in the matrix of complex coupling coefficients to become real.

13. The electromagnetic sensing system of claim 12, wherein the electromagnetic sensing system is configured to find the reversed time delay by minimizing an objective function Ø, such that:

$$\emptyset = [F_{11}e^{i\gamma_1 \Delta t}]^2_{im} + [F_{12}e^{i\gamma_1 \Delta t}]^2_{im} + [F_{13}e^{i\gamma_1 \Delta t}]^2_{im} + [F_{21}e^{i\gamma_2 \Delta t}]^2_{im} + [F_{22}e^{i\gamma_2 \Delta t}]^2_{im} + [F_{23}e^{i\gamma_2 \Delta t}]^2_{im} + [F_{31}e^{i\gamma_3 \Delta t}]^2_{im} + [F_{32}e^{i\gamma_3 \Delta t}]^2_{im} + [F_{33}e^{i\gamma_3 \Delta t}]^2_{im}$$

where $F_{AB}$ is a value in the matrix of complex coupling coefficients and A and B are values from 1 to 3, and Δt is a time shift between a measured start of epoch and the epoch origin where the first, second and third reference signals are at zero phase, where $\gamma_1 = 2\pi P f_b$; $\gamma_2 = 2\pi Q f_b$; $\gamma_3 = 2\pi R f_b$; where $f_b$ is a base frequency; and where P, Q and R are integer multiples of the base frequency.

14. The electromagnetic sensing system of claim 11, wherein the electromagnetic sensing system is further configured to scale and calibrate the first, second and third reference signals.

15. The electromagnetic sensing system of claim 11, wherein the first transmitter coil set is a set distance from the sensor chassis.

16. The electromagnetic sensing system of claim 15, wherein the electromagnetic sensing system further comprises:
a second transmitter coil set comprising a fourth transmitter coil, a fifth transmitter coil and a sixth transmitter coil, each having different dipole moment directions,
wherein the electromagnetic sensing system is further configured to:
transmit the first reference signal from the fourth transmitter coil, the second reference signal from the fifth transmitter coil, and the third reference signal from the sixth transmitter coil.

17. The electromagnetic sensing system of claim 16, wherein the second transmitter coil set is offset from the first transmitter coil set according to:

$$\frac{\Delta}{L} = \sqrt[4]{\frac{N}{M}} - 1$$

where L is the distance between a center of the sensor chassis and the first transmitter coil set, M is the signal strength of reference signals from the first transmitter coil set; N is the signal strength of reference signals from the second transmitter coil set; and Δ is the distance between the first transmitter coil set and the second transmitter coil set.

18. The electromagnetic sensing system of claim 17, wherein the use of the first transmitter coil set and the second transmitter coil set removes effects from changes in a location of the plurality of spaced sensors.

19. The electromagnetic sensing system of claim 16, further comprising a third transmitter coil set, wherein the electromagnetic sensing system is further configured to:
transmit the first reference signal, the second reference signal and the third reference signal from the third transmitter coil set.

20. The electromagnetic sensing system of claim 11, further comprising an Inertial Measurement Unit electromagnetically isolated from the sensor chassis to find an absolute orientation of the first transmitter coil set.

* * * * *